(No Model.) 2 Sheets—Sheet 2.
J. THOMSON.
PROPORTIONAL WATER METER.
No. 535,639. Patented Mar. 12, 1895.
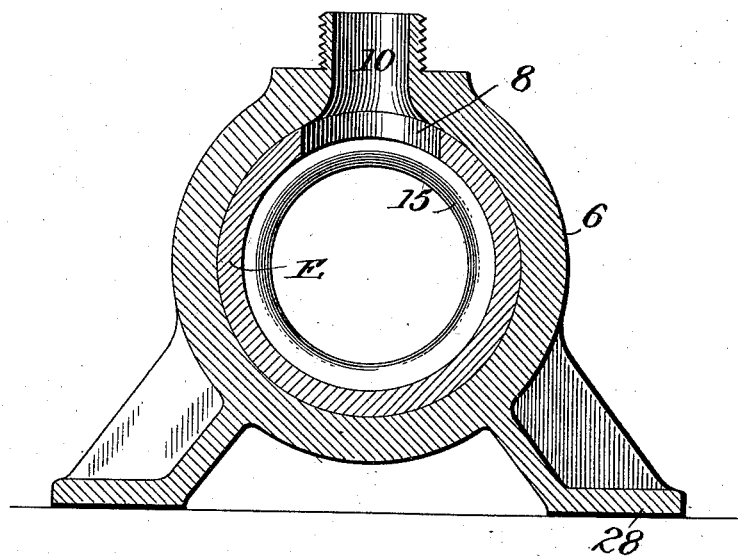
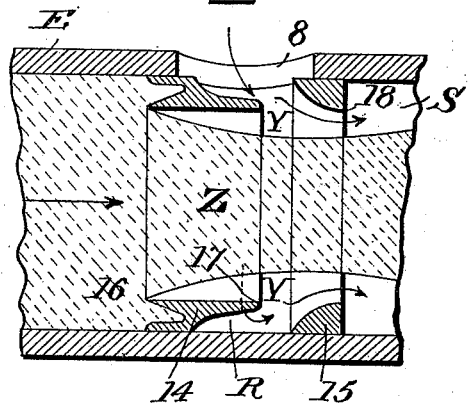
Witnesses Inventor
Jno. G. Hinkel John Thomson
A. N. Dobson By Foster Freeman
Attorneys

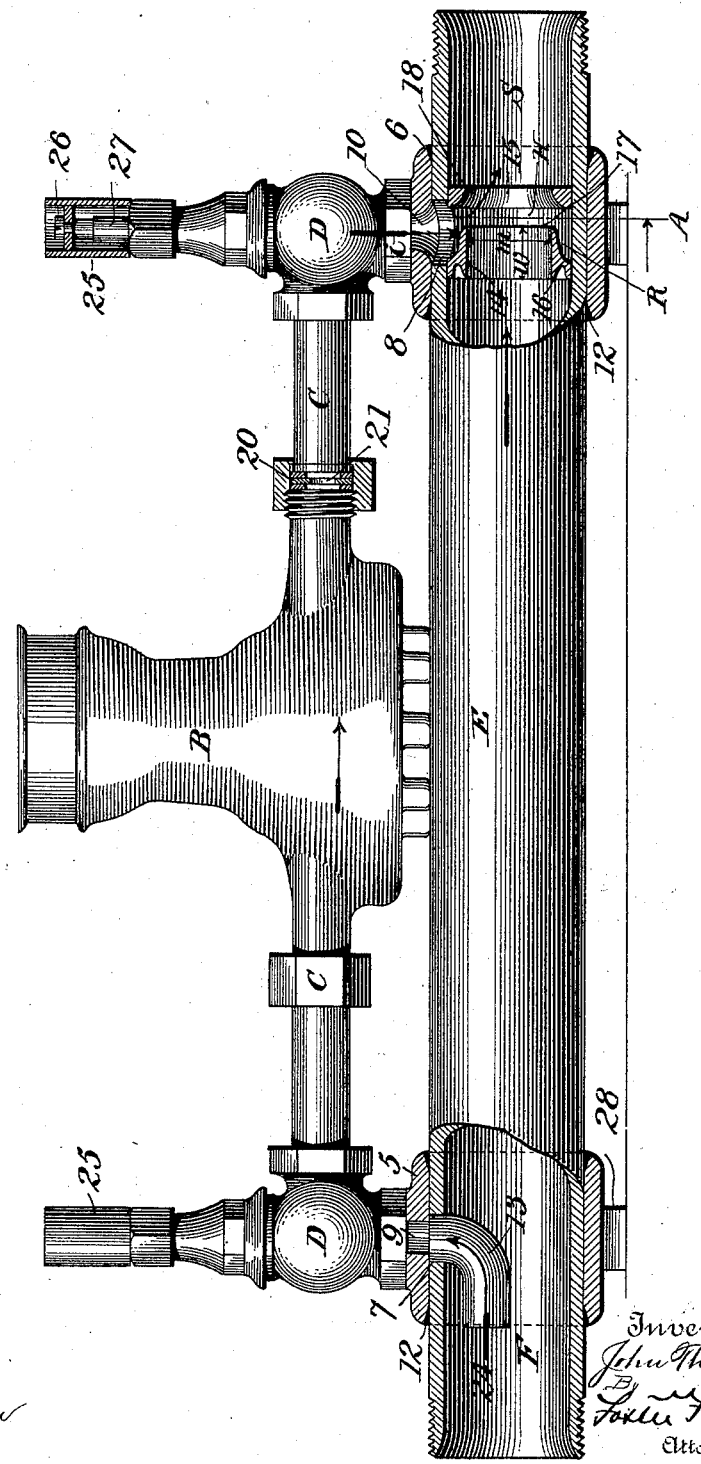

UNITED STATES PATENT OFFICE.

JOHN THOMSON, OF BROOKLYN, NEW YORK, ASSIGNOR TO THE NEPTUNE METER COMPANY, OF NEWARK, NEW JERSEY.

PROPORTIONAL WATER-METER.

SPECIFICATION forming part of Letters Patent No. 535,639, dated March 12, 1895.

Application filed January 12, 1894. Serial No. 496,692. (No model.)

*To all whom it may concern:*

Be it known that I, JOHN THOMSON, a citizen of the United States, residing at Brooklyn, in the county of Kings and State of New York, have invented certain new and useful Improvements in Proportional Water-Meters, of which the following is a specification.

My invention relates to proportional water meters, one object being to improve and simplify the construction of meters of different kinds, as for instance, that class of meters described and claimed in my pending application for a patent, Serial No. 458,720.

In the accompanying drawings, Figure 1 is a part side elevation and section showing my improved arrangement and construction. Fig. 2 is a cross sectional detail view on the line A. Fig. 3 is a sectional diagram illustrating the form of the main stream where it passes the intermediate chamber of the meter.

The first feature of this invention is in the general design and construction whereby the greater portion of the parts that constitute the meter may be produced by the employment of standard fittings with but little or no special adaptation. Thus, in the drawings, B is any standard meter of any desired capacity, having inlet and outlet ports or branches and with regular couplings C, for forming connections with the casings D of regular valves, while the main casing E is a simple brass or iron tube, preferably of the same diameter as the pipe circuit in which the meter is to be set. The connection of the valve casings D is made to saddles or sleeves 5, 6, adapted to the tube E. As shown they are sleeves of a diameter to freely slip over the main tube which is provided with openings as at 7, 8. An opening 9, in the sleeve 5 is to coincide with an opening 7 in the main casing, but an opening 10 in the sleeve 6 need not be in exact line with the larger opening 8, in the said casing. Now, when the position of the sleeve 5 is determined this will establish the location of the sleeve 6, when they simply require to be soldered to the casing around their champered edges, as 12, to secure them in position and make a water tight joint. If saddles are used as connections, they are clamped to the tube E, with intermediate packings. By this arrangement no great nicety of adaptation and adjustment is required in the length of the meter, of the couplings, or of the valves, and ordinary parts, most of them purchasable upon the market, may be availed of in constructing the meter.

The inlet to the meter B is preferably a bent inlet-tube 13, one end secured in the opening 7 of the main casing; the inlet end of the inlet tube being presented toward the inflowing stream and situated within what may be termed the inlet chamber F, of the tube E.

The outlet from the meter B is through the opening 10 of the sleeve 6, and thence through the opening 8 in the casing E to an "intermediate chamber" H, which is formed by and between two rings 14, 15 secured transversely within the main casing and on opposite side of the aforesaid opening 10. The inlet ring 14 is in fact a short cylindrical nozzle, having a sharp annular edge 16, which is presented toward the said inlet chamber F while its inner tubular projection 17, forms a surrounding annular space at R, so that the discharge from the meter as shown by the arrow $i$ is deflected by this tubular projection to all portions of said space. As shown, the outlet ring 15 is to be carefully rounded on the side next to the inlet ring for the purpose of affording the least obstruction to the discharge from the intermediate chamber to the outlet chamber S.

In the proportionment of the inlet ring it is preferable that its length $w$ shall be equal to about five or six tenths of its diameter $m$, and that in the relative location of the rings longitudinally in the main tube, the outer face 18 of the outlet ring shall be situated away from the inlet edge 16 of the inlet ring a distance about equal to seven or eight tenths of the diameter $m$. In this wise a clear unobstructed transverse space is afforded between the edges 17 and 18 of the rings; which space is situated forward of the inlet edge 16 a distance about equal to half of the diameter of the bore of the ring.

The objects sought in the construction just described will doubtless be evident to hydraulicians, hence will here require but brief specification. Thus, the inlet ring is a well known form of orifice affording the greatest contraction of jet and the lowest coefficient of discharge for a given diameter. This is employed that the greatest area of opening may be had whereby to freely pass matter that would obstruct a tapering nozzle of lesser diameter but having an equal discharging capacity. Moreover this orifice produces such a marked contraction of the jet at the point where it passes across the intermediate chamber as to leave an unobstructed surrounding, practically a free space, for the discharge of the measured aliquot volume delivered to the intermediate chamber through the meter. Therefore, it may be said of this device that the fluid within the intermediate chamber is, in a sense, caused to be positively withdrawn owing to the contraction of the jet delivered by the inlet ring through the intermediate chamber, so that the flow from the intermediate chamber to the outlet is not an "induced" flow, as commonly understood, nor does the volume discharged from the meter materially affect the form or velocity of the main jet in that, (as see the broken section Z, Fig. 3,) the discharge from the intermediate chamber to the outlet chamber S is delivered into and through the surrounding space, as Y; a space which is not occupied by the main stream during the period of its dynamic action.

As already pointed out in my pending application, Serial No. 458,720, it is desirable that the flow from the meter to the intermediate chamber shall be somewhat restricted; in other words that the receiving capacity of the intermediate chamber shall be greater than that of the supply. In the present instance this negative condition within the intermediate chamber may be produced by simply adjusting the valve which controls the outlet; but I prefer to control this by means of a diaphragm, as 20, applied at the outlet spud of the meter; as in this wise the valves may be closed and the meter be removed for examination or repair, or be substituted by another, with less likelihood of disturbing the proper registration. This is also a convenient means of calibrating the register, as by slightly varying the diameter of the opening 21 through the diaphragm the quantity delivered by the meter may be readily and accurately determined.

In the disposal of the inlet tube 13 it offers less obstruction to the flow through the main tube and is also less liable to introduce heavy particles into the meter, if its longitudinal center, as arrow 24, is kept somewhat above the center of the main stream, but at the same time, it is more favorable to uniform action to situate the tube to fully clear the wall of the main-casing, as shown.

Attention is called to the fact that the inlet tube may be dispensed with, employing a simple piezometric opening normal to the flow, as would be the opening 7; but the tube as shown is believed to be more constant in its receiving capacity at different rates of flow, besides which the meter is directly acted upon by the velocity head of the main stream, as in Pitot's tube, as well as by the loss of head due to the obstruction of the ring nozzle.

To prevent unauthorized interference with the valves, a tube 25, having a diaphragm or cap may be attached, as by a screw 26, to the spindle 27, so as to envelop the spindle. The screw may then be sealed in the ordinary manner. Hence, the spindle cannot be reached without first breaking the seal, and then removing the screw and the tube.

As shown in the drawings, feet or standards 28, are attached to the sleeves or saddles thus affording a neat and rigid means for supporting the structure.

The commercial advantage of this design may be best inferred by bearing in mind that the special work required for the construction of the meter, aside from the assemblage and calibration, relates only to the construction of the sleeves or saddle connections 5 and 6, and to the rings 14 and 15, and to the perforating of the tube or casing E.

While I have described the rings 14, 15 as means for securing a jet and forming an intermediate chamber I do not confine myself to these means as any other suitable construction of jet device may be used at this point.

Without limiting myself to the precise construction and arrangement of parts shown, I claim—

1. In a proportional meter the combination of a meter B, of any desired character, a tube E, valve casings, and couplings between the casings and the meter, connections between the valve casings and the tube E, and a jet device within the tube, the tube, couplings, valve casings and couplings being of standard construction, substantially as described.

2. A proportional meter consisting of a tube containing a jet device, with openings in the tube at separated points, valve casings communicating with said openings and a meter B, coupled with said casings, substantially as described.

3. The combination with the tube E, of a jet device within the tube having a chamber communicating with a port in the tube, a valve casing outside of the tube, and a connection between the valve casing and the tube consisting of a ring or saddle secured to the tube, substantially as set forth.

4. The combination with the casing, its jet device, the meter B, communicating with the said casing at two points, and means for restricting the flow from the meter to the jet device, substantially as set forth.

5. The combination of the tube E, the meter B, communicating with the casing at two points, and a removable diaphragm 20, arranged between the meter casing and the tube E, substantially as set forth.

6. The combination of the casing, its jet device, the meter B, the two valve casings D, each communicating with the tube E and with the meter, and a cap arranged to cover the valve spindle projecting beyond the casing, substantially as and for the purpose set forth.

In testimony whereof I have signed my name to this specification in the presence of two subscribing witnesses.

JOHN THOMSON.

Witnesses:
ROBERT S. CHAPPELL,
F. L. FREEMAN.